(12) United States Patent
Jurik et al.

(10) Patent No.: US 10,969,091 B2
(45) Date of Patent: Apr. 6, 2021

(54) BRAKING SYSTEM FOR AN AUTOMATED LUMINAIRE

(71) Applicant: Robe Lighting s.r.o., Roznov pod Radhostem (CZ)

(72) Inventors: Pavel Jurik, Prostredni Becva (CZ); Jindrich Vavrik, Zubri (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 17/011,554

(22) Filed: Sep. 3, 2020

(65) Prior Publication Data

US 2020/0400294 A1    Dec. 24, 2020

Related U.S. Application Data

(60) Provisional application No. 62/895,361, filed on Sep. 3, 2019.

(51) Int. Cl.
*F21V 23/00* (2015.01)
*F21V 21/30* (2006.01)
(Continued)

(52) U.S. Cl.
CPC ............ *F21V 23/003* (2013.01); *F21V 14/02* (2013.01); *F21V 21/15* (2013.01); *F21V 21/30* (2013.01); *F21W 2131/406* (2013.01)

(58) Field of Classification Search
CPC ........ F21V 23/003; F21V 14/02; F21V 21/15; F21V 21/30; F21W 2131/406
See application file for complete search history.

(56) References Cited

U.S. PATENT DOCUMENTS

| | | | | |
|---|---|---|---|---|
| 5,850,579 A | * | 12/1998 | Melby | .................... F16M 11/10 396/427 |
| 8,201,974 B1 | * | 6/2012 | Smith | ..................... F21S 8/003 362/257 |

(Continued)

FOREIGN PATENT DOCUMENTS

EP        1001212 A2     5/2000

OTHER PUBLICATIONS

European Extended Search Report dated Feb. 2, 2021; Application No. 20194175A filed on Sep. 3, 2019; 5 pages.

*Primary Examiner* — Zheng Song
(74) *Attorney, Agent, or Firm* — Conley Rose, P.C.; Brooks W Taylor

(57) ABSTRACT

A luminaire is provided that includes a head, a movement system, and a control system. The movement system rotates the luminaire head around an axis of rotation. The movement system includes a motor and a braking system. The motor rotates the head about the axis of rotation and the braking system can prevent rotation of the motor. The control system receives an Engage Brake command via a data link. The control system engages the braking system in response to the Engage Brake command by determining whether the motor is rotating, causing rotation of the motor to stop electrically when the motor is rotating, determining whether the motor has stopped rotating, engaging the braking system when the motor has stopped rotating, and removing power from the motor. When the motor is stopped, the control system may store in non-volatile memory a current absolute position of the luminaire head.

19 Claims, 8 Drawing Sheets

(51) Int. Cl.
 *F21V 14/02* (2006.01)
 *F21V 21/15* (2006.01)
 *F21W 131/406* (2006.01)

(56) References Cited

U.S. PATENT DOCUMENTS

| | | | |
|---|---|---|---|
| 8,764,252 B2 * | 7/2014 | Evans | F21V 21/15 362/386 |
| 2011/0164428 A1 * | 7/2011 | Brutsche | F21V 21/108 362/427 |
| 2013/0201686 A1 * | 8/2013 | Dalsgaard | F21V 21/14 362/249.1 |
| 2013/0201703 A1 * | 8/2013 | Dalsgaard | F21V 21/26 362/427 |
| 2014/0009949 A1 | 1/2014 | Evans | |
| 2015/0003099 A1 * | 1/2015 | Rasmussen | G01D 5/145 362/523 |
| 2015/0062861 A1 * | 3/2015 | Yamashita | F21V 14/02 362/5 |
| 2018/0112859 A1 * | 4/2018 | Yamamoto | F21V 21/15 |

* cited by examiner

BRAKING SYSTEM FOR AN AUTOMATED LUMINAIRE

CROSS-REFERENCE TO RELATED APPLICATIONS

This application claims priority to U.S. Provisional Application No. 62/895,361 filed on Sep. 3, 2019 by Pavel Jurik, et al. entitled, "Braking System for Automated Luminaires", which is incorporated by reference herein as if reproduced in its entirety.

TECHNICAL FIELD OF THE DISCLOSURE

The disclosure generally relates to automated luminaires, and more specifically to a method for deploying and controlling brakes on the pan and tilt axes of an automated luminaire.

BACKGROUND

Luminaires with automated and remotely controllable functionality (referred to as automated luminaires) are well known in the entertainment and architectural lighting markets. Such products are commonly used in theatres, television studios, concerts, theme parks, night clubs, and other venues. A typical automated luminaire provides control from a remote location of the pan and tilt functions of the luminaire allowing an operator to control the direction the luminaire is pointing and thus the position of the light beam on the stage or in the studio. Typically, this position control is done via control of the luminaire's position in two orthogonal rotational axes usually referred to as pan and tilt. Many automated luminaires additionally or alternatively provide control from the remote location of other parameters such as intensity, focus, beam size, beam shape, and/or beam pattern of light beam(s) emitted from the luminaire.

SUMMARY

In a first embodiment, a luminaire includes a luminaire head, a movement system, and a control system. The luminaire head includes one or more optical devices. The movement system is mechanically coupled to the luminaire head and is configured to rotate the luminaire head around an axis of rotation. The movement system includes a motor and a braking system. The motor is coupled by a mechanical coupling to the luminaire head and is configured to rotate the luminaire head about the axis of rotation. The braking system is coupled by a mechanical coupling to a shaft of the motor and is configured to prevent rotation of the shaft of the motor. The control system is electrically coupled to the motor and the braking system and is configured to receive an Engage Brake command via a data link. The control system engages the braking system in response to the Engage Brake command by determining whether the motor is rotating, causing rotation of the motor to stop electrically when the motor is rotating, determining whether the motor has stopped rotating, engaging the braking system when the motor has stopped rotating, and removing power from the motor.

In a second embodiment, a luminaire includes a luminaire head, a movement system, and a control system. The luminaire head includes one or more optical devices. The movement system is mechanically coupled to the luminaire head and is configured to rotate the luminaire head around an axis of rotation. The movement system includes a motor and a braking system. The motor is coupled by a mechanical coupling to the luminaire head and is configured to rotate the luminaire head about the axis of rotation. The braking system is coupled by a mechanical coupling to a shaft of the motor and is configured to prevent rotation of the shaft of the motor. The control system is electrically coupled to the motor and the braking system and is configured to receive an Engage Brake command via a data link. The control system engages the braking system in response to the Engage Brake command by determining whether the motor is rotating, causing rotation of the motor to stop electrically when the motor is rotating, determining whether the motor has stopped rotating, engaging the braking system when the motor has stopped rotating, storing in non-volatile memory a current absolute position of the luminaire head, and removing power from the motor.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Figure 1:
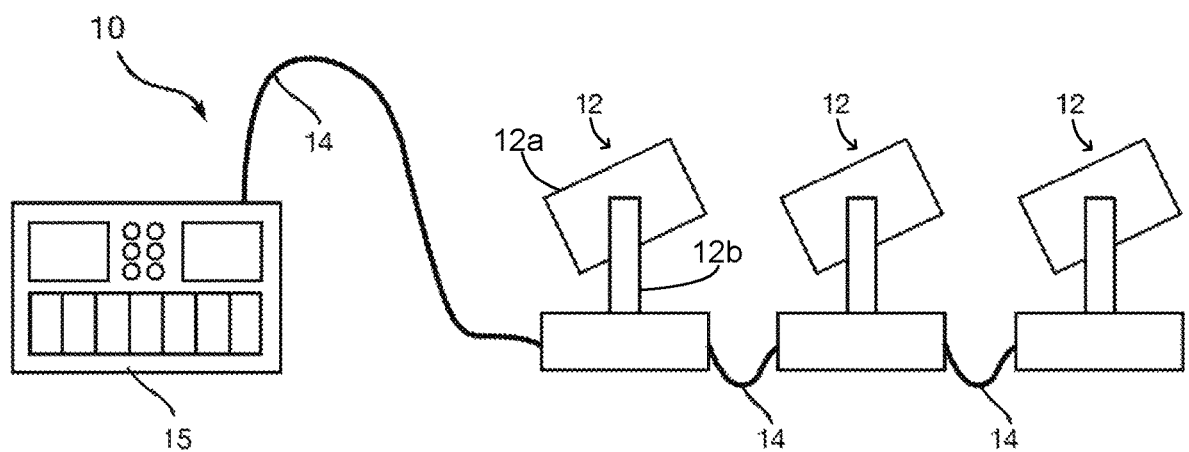
FIG. 1 presents a schematic view of an automated luminaire system according to the disclosure.

FIG. 1 presents a schematic view of a luminaire system 10 according to the disclosure. The luminaire system 10 includes a plurality of luminaires 12 according to the disclosure. The luminaires 12 each contains on-board a light source, one or more of color changing systems, light modulation devices, and pan and/or tilt systems to control an orientation of a head of the luminaire 12. Mechanical drive systems to control parameters of the luminaire 12 include motors or other suitable actuators coupled to a control system, as described in more detail with reference to FIG. 2, which is configured to control the motors or other actuators.

The luminaire 12 includes a luminaire head 12a mounted in a yoke 12b. The yoke 12b rotates around a pan axis of rotation (vertical in the plane of the page in FIG. 1). The luminaire head 12a rotates within the yoke 12b around a tilt axis of rotation (perpendicular to the page in FIG. 1).

In addition to being connected to mains power either directly or through a power distribution system, the control system of each luminaire 12 is connected in series or in parallel by a data link 14 to one or more control desks 15. Upon actuation by an operator, the control desk 15 sends control signals via the data link 14, where the control signals are received by the control system of one or more of the luminaires 12. The control systems of the one or more of the luminaires 12 that receive the control signals may respond by changing one or more of the parameters of the receiving luminaires 12. The control signals are sent by the control desk 15 to the luminaires 12 using DMX-512, Art-Net, ACN (Architecture for Control Networks), Streaming ACN, or other suitable communication protocol.

The luminaire head 12a comprises one or more optical systems, which include optical devices such as gobo wheels, effects wheels, and color mixing (or other color changing) systems, as well as prism, iris, shutter, and lens movement systems. Some or all of the optical systems include stepper motors or other actuators to cause movement of their associated optical system. The stepper motors and/or actuators of the luminaire head 12a are electrically coupled to and under the control of the control system of the luminaire 12.

Automated luminaires 12 may also include stepper motors or servo motors to cause pan and tilt movement of the luminaire head to position its emitted beam where required on a stage. In some luminaires, the head may be pushed out of position by an external force while power is removed from the pan and/or tilt motors. In other luminaires, the head is unbalanced or likely to move under gravity for some other reason while power is removed from the motors.

Where such luminaires include servo motors, the servo motor is typically coupled to the luminaire head through a gear reduction drive, which holds the head in position even when power is not being applied to the servo motor. Where such luminaires include stepper motors, the head may be maintained in a constant orientation by applying power to the pan and/or tilt stepper motors at all times to hold the motor(s) in position. During design of such a luminaire, the forces experienced by a head in its most unbalanced configuration may be determined, and the current needed to be applied to the motor(s) to hold the head in position against this imbalance also determined. Such a current is typically referred to as a "holding current." The holding current is less than a current required to cause motion of the luminaire head.

In automated luminaires according to the disclosure, the pan and tilt positions of a luminaire head remain fixed even when power is removed from the pan/tilt motors. Also in such automated luminaires, the operator is able to lock the pan and tilt in position without using motor power. For example, in some scenarios an automated luminaire may be installed in a position where the luminaire head can move and strike a piece of scenery. In such a scenario, the operator may desire to lock down the luminaire head of an automated luminaire according to the disclosure to prevent the luminaire head from hitting that piece of scenery, whether or not the automated luminaire is powered up. In other scenarios (for example in theatre productions, trade shows, or TV shows), an automated luminaire may be used as a repositionable luminaire—i.e., one whose position and pan/tilt orientation is set once, during set-up, and then its pan/tilt orientation is not altered during the production. In such scenarios, an automated luminaire according to the disclosure is configured to lock the pan and tilt motion for the duration of the production, to ensure that the pan/tilt orientation of the luminaire head does not change.

Figure 2:
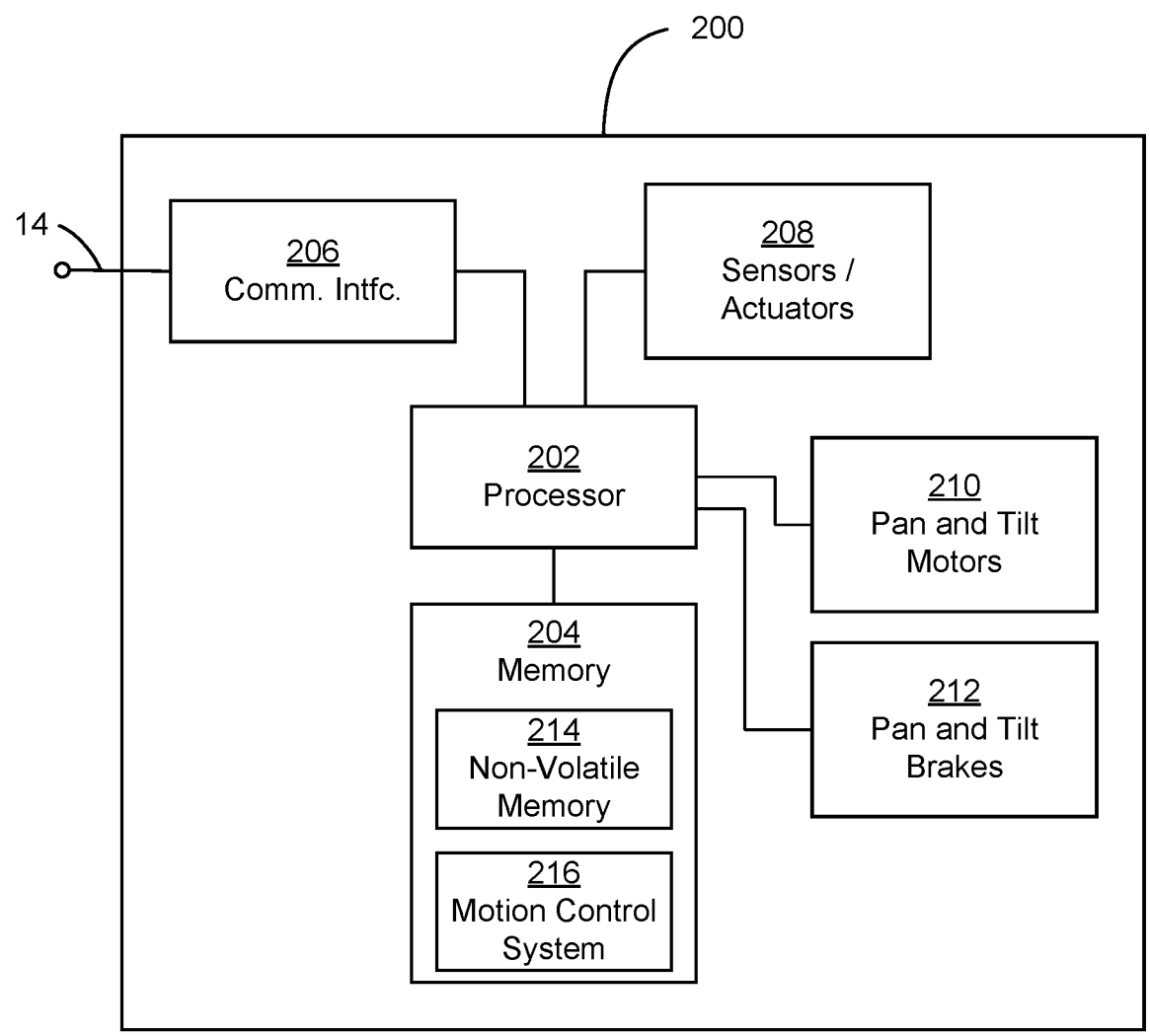
FIG. 2 presents a block diagram of a control system according to the disclosure.

FIG. 2 presents a block diagram of a control system (or controller) 200 according to the disclosure. The control system 200 is suitable for use to control the pan and tilt movement systems 301 and 311 of FIG. 3 and other luminaire head movement systems according to the disclosure. The control system 200 is also suitable for controlling the light source, color changing devices, light modulation devices, pan and/or tilt systems, and other control functions of the automated luminaires 12.

The control system 200 includes a processor 202 electrically coupled to a memory 204. The processor 202 is implemented by hardware and software. The processor 202 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 202 is further electrically coupled to and in communication with a communication interface 206. The communication interface 206 is coupled to, and configured to communicate via, the data link 14. The processor 202 is also coupled via a control interface 208 to one or more sensors, motors, actuators, controls and/or other devices. The processor 202 is configured to receive control signals from the data link 14 via the communication interface 206 and, in response, to control systems and mechanisms of the automated luminaire 12 via the control interface 208.

The processor 202 is further electrically coupled to and in communication with pan and tilt motors 210 and pan and tilt brakes 212. The control system 200 is suitable for implementing processes, module control, optical device control, pan and tilt movement, parameter control, motor control, brake control, and other functionality as disclosed herein, which may be implemented as instructions stored in the memory 204 and executed by the processor 202. The memory 204 comprises one or more disks and/or solid-state drives and may be used to store instructions and data that are read and written during program execution. The memory 204 may be volatile and/or non-volatile and may be read-only memory (ROM), random access memory (RAM), ternary content-addressable memory (TCAM), and/or static random-access memory (SRAM).

Figure 3:
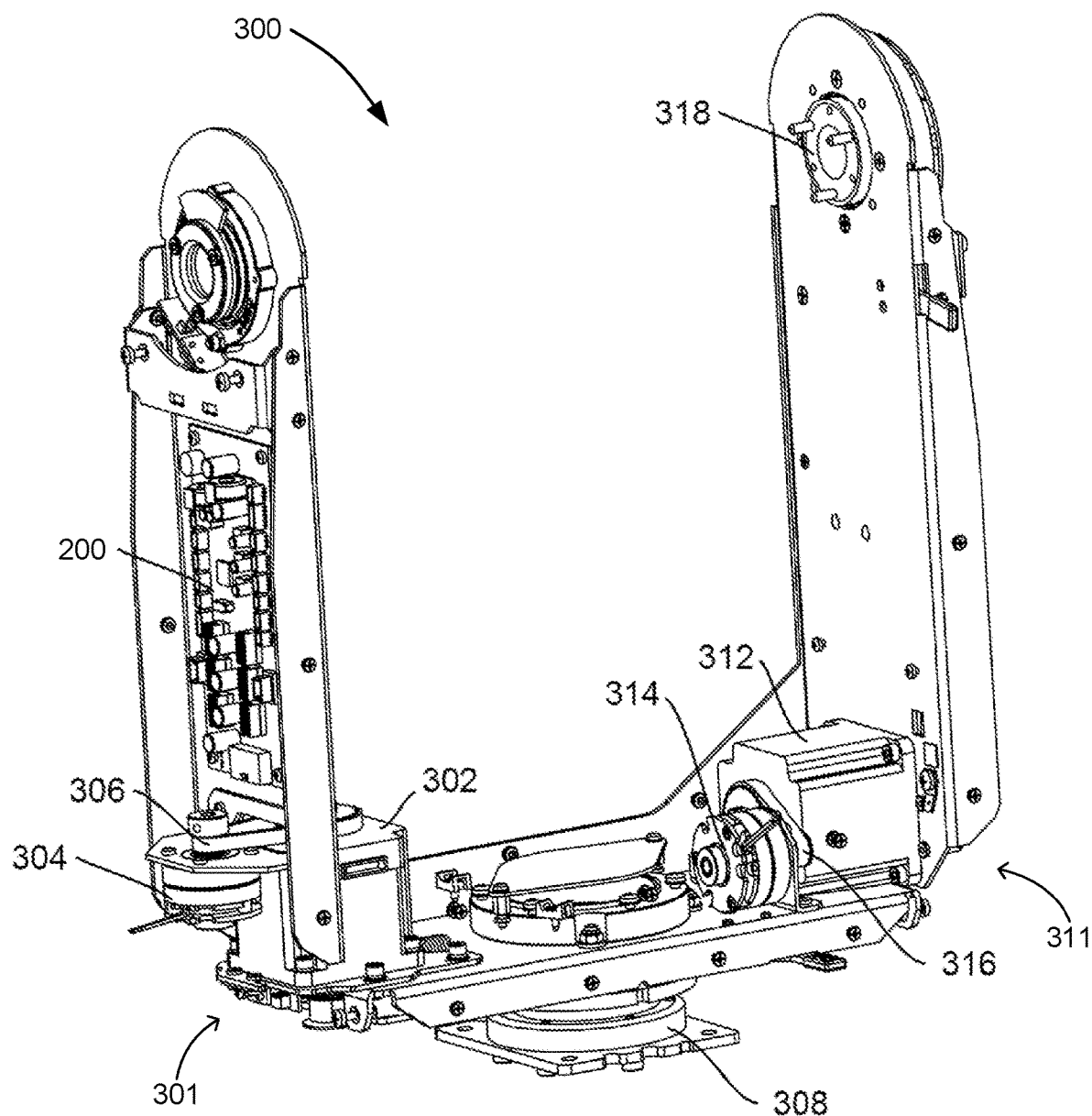
FIG. 3 presents a view of a pan and tilt yoke of an automated luminaire according to the disclosure.

FIG. 3 presents a view of a pan and tilt yoke 300 of the automated luminaire 12 according to the disclosure. The pan and tilt yoke 300 includes a pan movement system 301 and a tilt movement system 311. The pan movement system 301 comprises a pan motor 302, which is a stepper motor, direct current (DC) servo motor, or other suitably powerful motor type. The pan motor 302 is configured to cause rotation of the pan and tilt yoke relative to a fixed support around a pan axis of rotation passing through a bearing 308. A motor shaft of the pan motor 302 extends from opposite sides of the pan motor 302. A first end of the motor shaft of the pan motor 302 is coupled via a drive mechanism such as a belt or gear train to an element of the bearing 308 to rotate the pan and tilt yoke relative to the fixed support. A second end of the motor shaft of the pan motor 302 is mechanically coupled via a belt 306 to a pan braking system 304. The pan braking system 304 is an electrically controllable brake using a magnetic system to provide braking torque to prevent rotation of the motor shaft of the pan motor 302. In some embodiments, the braking friction of the pan braking system 304 can be adjusted manually. In other embodiments, the control system 200 is configured to adjust the braking friction of the pan braking system 304 electrically in response to a Braking Friction command received via the data link 14, the Braking Friction command comprising data representing a desired amount of braking friction of the pan braking system 304.

The tilt movement system 311 comprises a tilt motor 312. The tilt motor 312 is a stepper motor, DC servo motor, or other suitably powerful motor type. The tilt motor 312 is configured to cause rotation of a luminaire head (not shown in FIG. 3) relative to the pan and tilt yoke 300 around a tilt axis of rotation passing through a bearing 318. The tilt axis of rotation is orthogonal to the pan axis of rotation. A motor shaft of the tilt motor 312 extends from opposite sides of the tilt motor 312. A first end of the motor shaft of the tilt motor 312 is coupled via a drive mechanism such as a belt or gear train to an element of the bearing 318 to rotate the pan and tilt yoke 300 relative to the fixed support. A second end of the motor shaft of the tilt motor 312 is mechanically coupled via a belt 316 to a tilt braking system 314. The tilt braking system 314 is an electrically controllable brake using a magnetic system to provide braking torque to prevent rotation of the motor shaft of the tilt motor 312.

In some embodiments, the braking friction of the tilt braking system 314 can be adjusted manually. In other embodiments, the control system 200 is configured to adjust the braking friction of the tilt braking system 314 electrically in response to control signals received via the data link 14.

As described with reference to FIG. 2, the control system 200 is coupled to sensors, actuators, the pan and tilt motors 302 and 312, and (in some embodiments) the pan and/or tilt braking systems 304 and 314 to control the pan and tilt motion of the pan and tilt yoke 300.

Figure 4:
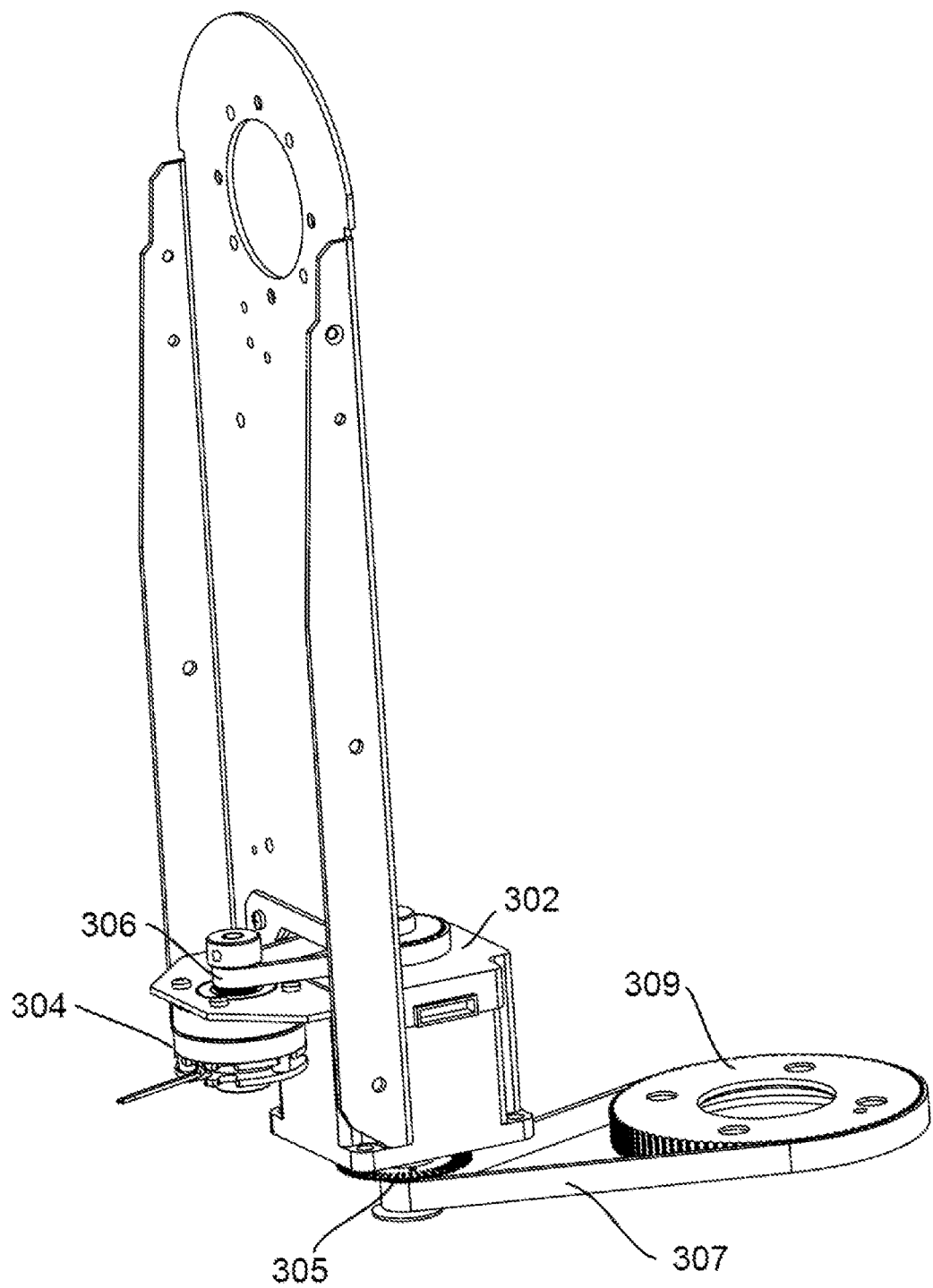
FIG. 4 presents a detail view of the pan system of the pan and tilt yoke shown in FIG. 3.

FIG. 4 presents a detail view of the pan system of the pan and tilt yoke 300 shown in FIG. 3. In FIG. 4, the pan system is removed from most of the pan and tilt yoke 300 in order to be shown more clearly. It may be seen in FIG. 4 that the first end of the motor shaft of the pan motor 302 is mechanically coupled via the pan drive belt 307 to a main pan gear 309, which is mechanically coupled to an element of the bearing 308 shown in FIG. 3. A pan quadrature encoder wheel 305 is also coupled to the first end of the motor shaft of the pan motor 302. The pan quadrature encoder wheel 305 is sensed by a pan optical sensor (not shown in FIG. 4), which is electrically coupled to the control system 200 to send signals related to rotation and speed information of the pan motor 302 to the processor 202. The pan quadrature encoder wheel 305 and the pan optical sensor together may be referred to as a pan motion quadrature encoder system.

Figure 5:
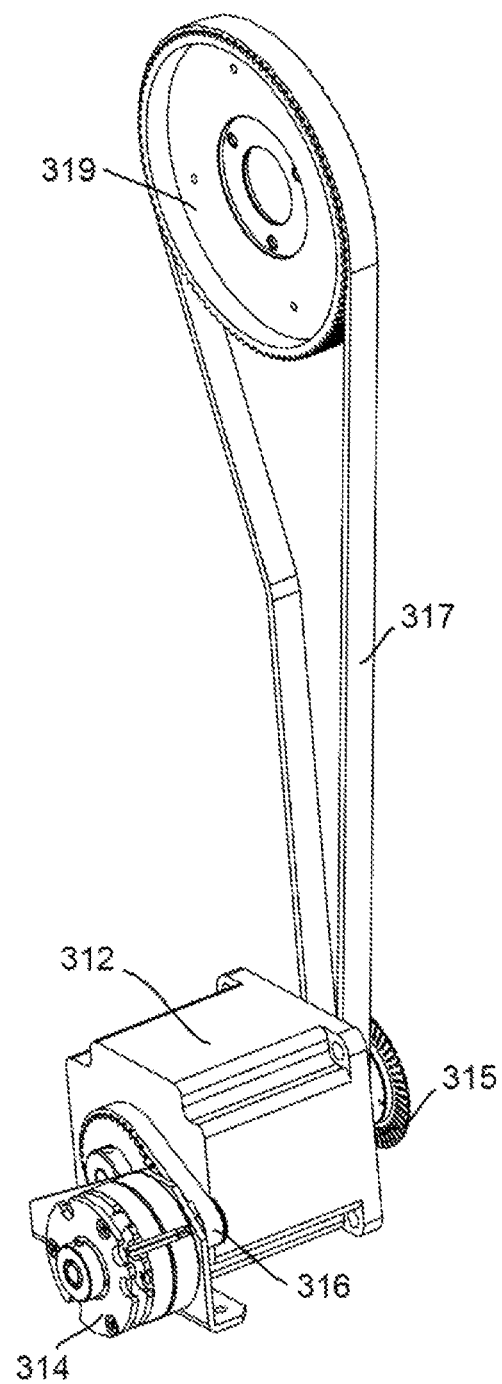
FIG. 5 presents a detail view of the tilt system of the pan and tilt yoke shown in FIG. 3.

FIG. 5 presents a detail view of the tilt system of the pan and tilt yoke 300 shown in FIG. 3. In FIG. 5, the tilt system is removed from the pan and tilt yoke 300 in order to be shown more clearly. It may be seen in FIG. 5 that the first end of the motor shaft of tilt motor 312 is mechanically coupled via the tilt drive belt 317 to a main tilt gear 319, which is mechanically coupled to an element of the bearing 318 shown in FIG. 3. A tilt quadrature encoder wheel 315 is also coupled to the first end of the motor shaft of the tilt motor 312. The tilt quadrature encoder wheel 315 is sensed by a tilt optical sensor (not shown in FIG. 5), which is electrically coupled to the control system 200 to send signals related to rotation and speed information of the tilt motor 312 to the processor 202. The tilt quadrature encoder wheel 315 and the tilt optical sensor together may be referred to as a tilt motion quadrature encoder system.

The control system 200 executes instructions in the memory 204 that comprise a motion control system 216 that controls the pan and tilt movement systems 301 and 311 of FIG. 3. The pan and tilt movement systems 301 and 311 do not have an absolute position encoder; instead they have pan and tilt quadrature encoder wheels 305 and 315 that control pan and tilt counters to measure relative motion of the pan and tilt motors 302 and 312. In some embodiments (taking the pan system 301 as an example), the motion control system 216 calibrates an absolute pan position of the luminaire head in the pan axis of rotation upon power up of the luminaire 12 using a calibration process that comprises driving the pan movement system 301 in a first direction until a first motion end stop is reached, storing a first pan counter value, driving the movement system 301 in a second direction until a second motion end stop is reached, and storing a second pan counter value. Thereafter, the motion control system 216 compares a current pan counter value to the first and second stored pan counter values to calculate a current absolute position of the luminaire head in the pan axis of rotation. The motion control system 216 calibrates an absolute position of the luminaire head in the tilt axis of rotation using a similar process.

In such embodiments, the time and the physical movement of the luminaire head that are required for such a position calibration process may be avoided by the processor 202, whenever the pan or tilt motion of the luminaire head is stopped (either by operator command or upon removal of power from the luminaire 12), obtaining from the motion control system 216 a current calculated absolute pan and/or tilt position of the luminaire head and storing the obtained positions in non-volatile memory 214 of the memory 204. An Enable Calibration command signal, received via the data link 14, allows an operator of the luminaire 12 to select whether the control system 200 performs the position calibration process described above on power up or initializes the motion control system 216 with calculated absolute pan and tilt positions that were stored before the luminaire 12 was last powered down. In some embodiments, the luminaire 12 may default to initializing with the stored positions and not perform the position calibration process until commanded to do so by an operator.

For example, if the luminaire 12 is being used in a theatre or other venue where the fixtures are typically not touched between shows, position calibration may be disabled and stored absolute pan and tilt positions used instead. Similarly, where the luminaire 12 is protruding through a small hole in scenery or is in a mounting position where head movement is restricted by set pieces or truss elements, the luminaire 12 may be calibrated using head movement before it is mounted in position, and position calibration disabled thereafter to avoid damage to set pieces or to the luminaire 12 itself. On the other hand, where the luminaire 12 is taken from its mounting position and reoriented by hand for packing into a travel container, the position calibration process is required upon power up, as the luminaire head will not likely be in the same orientation it was when the luminaire 12 was powered off.

Figure 6:
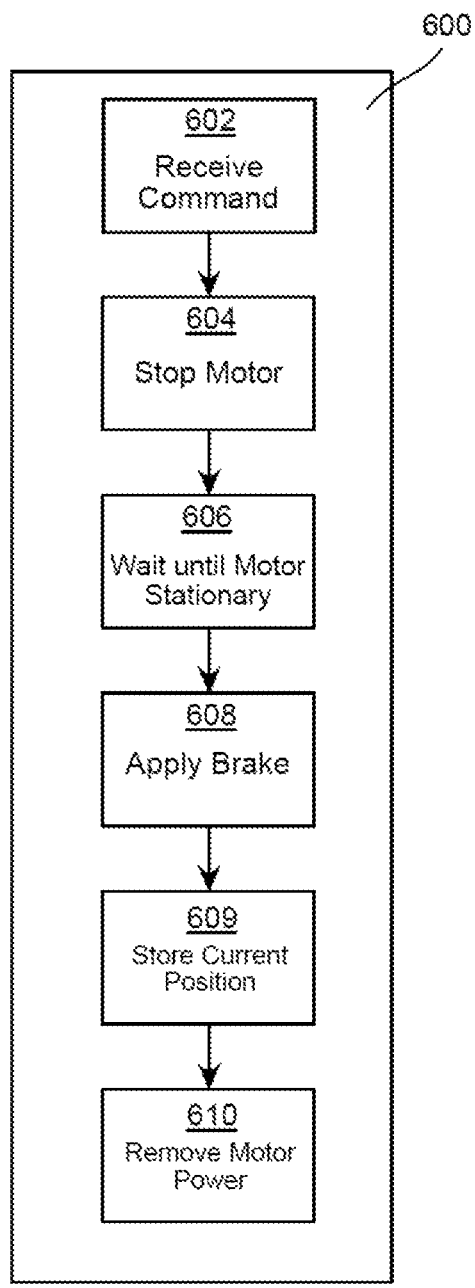
FIG. 6 presents a flow chart of a process for engaging the pan braking system of an automated luminaire according to the disclosure.

FIG. 6 presents a flow chart of a process 600 for engaging the pan braking system 304 of an automated luminaire according to the disclosure. The same process may be used to engage the tilt braking system 314. In step 602, the processor 202 receives an Engage Brake command signal via the data link 14, specifying that one or both motor brakes be applied. In some embodiments, the Engage Brake command signal comprises a command parameter having a value that includes a pan flag and/or a tilt flag, the flags selecting whether one or both of the associated pan and tilt braking systems 304 and 314 are to be engaged. In other embodiments, the Engage Brake command signal includes no parameter data and commands the processor 202 to engage both pan and tilt braking systems 304 and 314 or only a predetermined one of the pan and tilt braking systems 304 and 314.

If the pan braking system 304 is to be engaged, in step 604 the processor 202 responds to the Engage Brake command signal by determining whether the pan motor 302 is currently rotating or is stationary. If the pan motor 302 is stationary, the process 600 continues at step 608, described below. If the pan motor 302 is rotating, in step 604 the processor 202 responds to the Engage Brake command signal by causing the rotation of the pan motor 302 to stop electrically. In some embodiments, the pan motor 302 may be caused to stop electrically by reducing the pulse frequency (and/or reducing the current) of electrical signals applied to the pan motor 302, taking into account the momentum of the moving head by calculating deceleration and velocity profiles to provide a smooth slow down and stop. In other embodiments, pulses to cause the motor to accelerate in the direction opposite of the current direction of travel (perhaps at an increased current) may be applied to the pan motor 302 to cause it to stop electrically. In still other embodiments, the windings of the pan motor 302 may be electrically shorted, to cause induced electromotive force to slow and stop the pan motor 302.

Stopping a pan motor 302 is not an instantaneous process—the pan motor 302 takes some period of time to slow down and stop the mass of the luminaire head 12a. Accordingly, in step 606 the processor 202 waits until it receives signals from the pan movement system 301 that the pan motor 302 is stationary. In some embodiments, motion of the pan motor 302 is determined by checking signals from the pan optical sensor relating to motion of the pan quadrature encoder wheel 305, as described with reference to FIG. 4. When the pan optical sensor (or other feedback system) indicates that the pan motor 302 is stationary, then in step 608, the processor 202 removes power from the pan braking system 304 to allow it to engage the brake under spring force.

In step 609, the processor 202 stores a current calculated absolute pan position of the head in the non-volatile memory 214. Finally, in step 610, after a short delay (if needed to ensure that the pan braking system 304 has fully engaged), the processor 202 removes any holding current applied to the pan motor 302 as part of stopping the pan motor 302 in step 604, thereby removing power from the pan motor 302.

The step 609 is optional. In some embodiments, it may be performed after the step 610 instead of before or in parallel with. In embodiments where a position calibration process is always performed, the step 609 may not be performed at all.

In some embodiments, steps 604, 606, 608, 609, and 610 may be performed for the pan motor 302 and the pan braking system 304 independently and in parallel to performing the same steps for the tilt motor 312 and the tilt braking system 314.

In some embodiments, when the control system 200 determines that electrical power has been removed from the luminaire 12 (for example by disconnecting from mains power or switching off a power switch) while the luminaire head is in motion, the process 600 is performed for both the pan and/or tilt movement systems 301 and 311. In such embodiments, the power supply (which in some embodiments includes a battery) is designed to keep the control system 200 and the pan and tilt movement systems 301 and 311 powered for long enough to complete the process 600 for both pan and tilt. The processor 202 may determine that power has been removed from the luminaire 12 by sensing whether electrical power is currently applied to other elements of the control system 200 or to other subsystems of the luminaire 12.

In some embodiments, the Engage Brake command signal includes a control parameter with flags specifying whether power is to be removed from the pan and/or tilt motors once the pan and/or tilt brakes are engaged. If one or both flags are set, the processor 202 does not remove power from corresponding ones of the pan and tilt motors 302 and 312 in step 610—that is, it continues to apply a holding current to corresponding ones of the pan and tilt motors 302 and 312. Applying the brakes but not removing power from the motors would allow the system to be resistant to displacement by external forces, but also to be ready to start up again more quickly once the brakes are disengaged. For example, in scenarios where an automated luminaire according to the disclosure is attached to a truss that moves during a performance, the operator might command the automated luminaire to apply the brakes, in order to ensure that the luminaire head does not change orientation while the truss is moving, but to continue applying a holding current to the motors, in order to keep the automated luminaire ready to begin pan and/or tilt motion again as quickly as possible, after the truss is repositioned.

Figure 7:
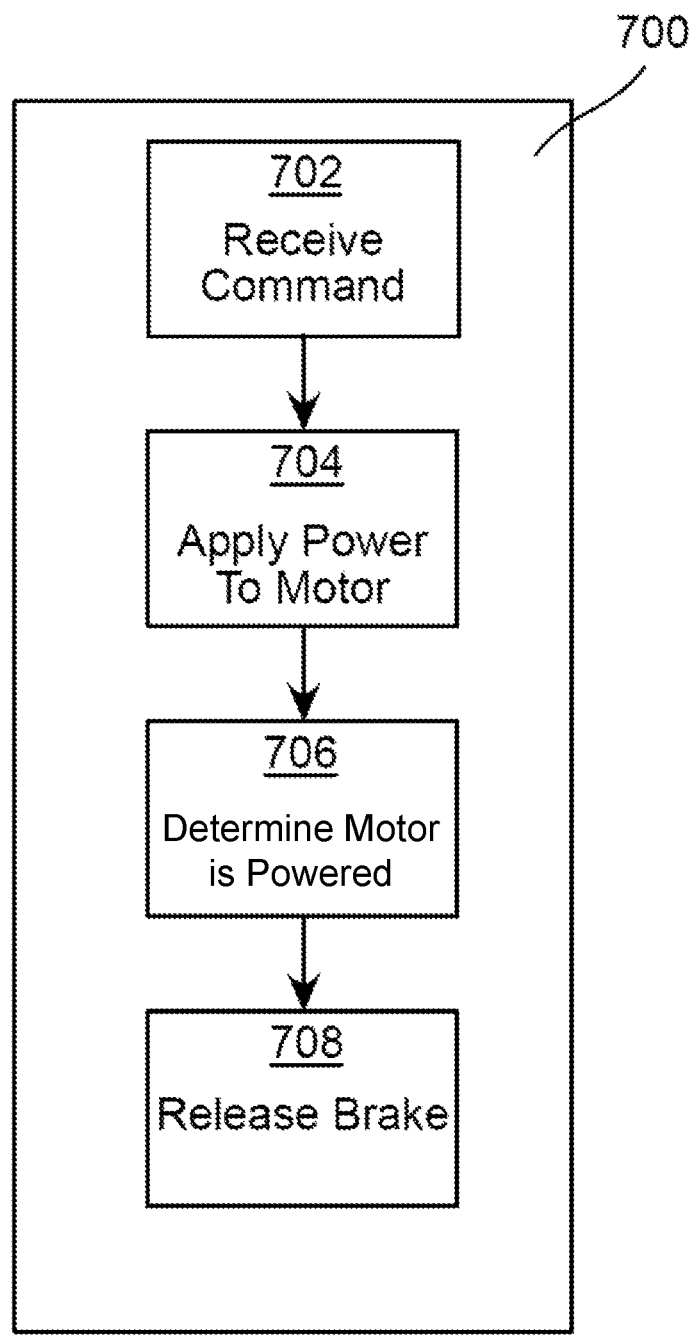
FIG. 7 presents a flow chart of a process for releasing (disengaging) the pan braking system of an automated luminaire according to the disclosure.

FIG. 7 presents a flow chart of a process 700 for releasing (disengaging) the pan braking system 304 of an automated luminaire according to the disclosure. The same process may be used to release the tilt braking system 314. In step 702, the processor 202 receives a Disengage Brake command signal via the data link 14 specifying that one or both motor brakes be released. In step 704, the processor 202 reacts to the Disengage Brake command signal by causing power (for example the holding current or another current less than that required to initiate motion) to be applied to the pan motor 302.

In step 706, the processor 202 determines whether power has been applied to the pan motor 302. In some embodiments, the processor 202 determines that power has been applied by waiting for a preset period of time before proceeding to step 708. This preset period can be established during design of the product by measuring a rise time of the motor current. Such a rise time may be a function of the inductance of the motor coils, the voltage applied, the capacity of the power supply, and the impedance of the power supply and electrical connections. In other embodiments, the processor 202 may be electrically coupled to respective pan and tilt motor current sensors and the processor 202 determines that power has been applied when the motor currents reach preset threshold values. Once it has been determined in step 706 that power has been applied to the pan motor 302, in step 708, the processor 202 applies power to the pan braking system 304, thereby releasing (or disengaging) the brake.

In some embodiments, steps 704, 706, and 708 may be performed for the pan motor 302 and the pan braking system 304 independently and in parallel to the tilt motor 312 and the tilt braking system 314. As described with reference to FIG. 6, in some embodiments, according to control parameter flags in the Engage Brake command signal, power may not be removed from pan and tilt motors 302 and 312. In such embodiments, steps 704 and 706 of the process 700 may be skipped, as power will already be applied to one or both of the pan and tilt motors 302 and 312.

Figure 8:
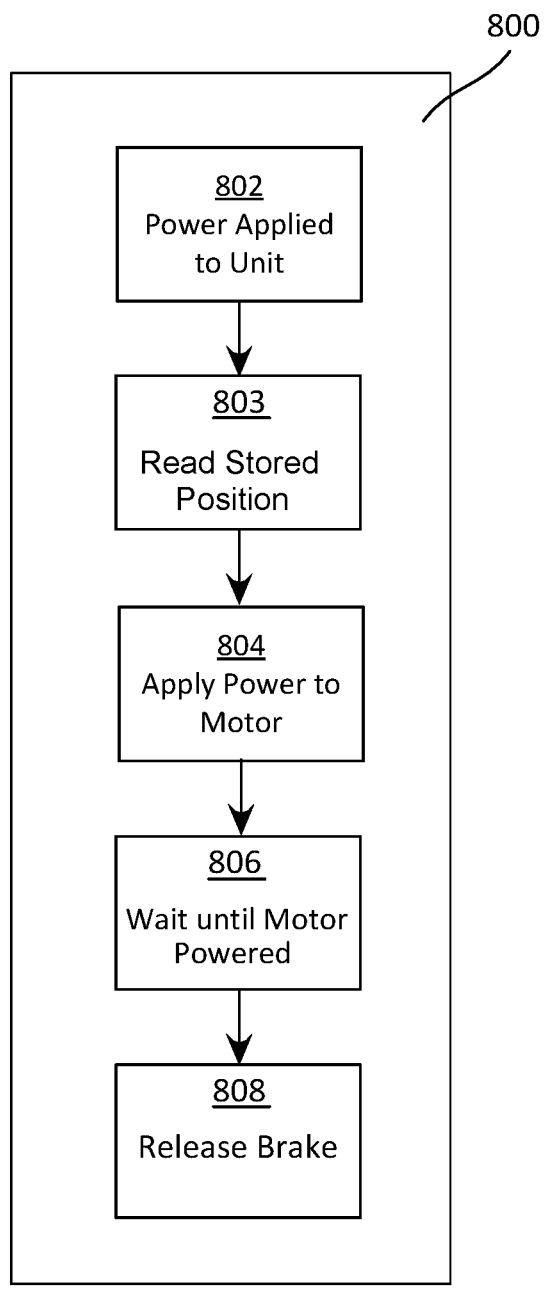
FIG. 8 presents a flow chart of a process performed at power up of an automated luminaire according to the disclosure.

FIG. 8 presents a flow chart of a process 800 performed at power up of an automated luminaire according to the disclosure. The process 800 is used in embodiments that perform step 609 of the process 600, where the processor 202 stores a current calculated absolute pan and/or position of the head in the non-volatile memory 214 when the pan and tilt motors 302 and 312 are brought to a stop. The process 800 releases (or disengages) the pan braking system 304 of the luminaire 12. The process 800 may also be used to release the tilt braking system 314.

In step 802, the processor 202 determines that electrical power has been applied to the luminaire 12. Power may be applied to the luminaire 12 by switching on a power switch or otherwise connecting the luminaire 12 to mains power. The processor 202 may determine that power has been applied to the luminaire 12 by recognizing instructions currently being executed as power-on startup instructions. Where the processor 202 is battery powered, it may determine that power has been applied to the luminaire 12 by sensing electrical power applied to other elements of the control system 200 or to other subsystems of the luminaire 12. In step 803, the processor 202 reads the calculated absolute pan and/or position of the head that were stored in the non-volatile memory 214 when the pan and tilt motors 302 and 312 are last brought to a stop.

Steps 804, 806, and 808 are similar to steps 704, 706, and 708 of the process 700. In step 804, the processor 202 causes power to be applied to the pan motor 302. In step 806, the processor 202 waits until the power has been applied to the pan motor 302. Once step 806 is complete, in step 808, the processor 202 applies power to the pan braking system 304, thereby releasing the brake.

Although a system with belt drive from the motor to the brakes is described, the system is not so limited. In other embodiments, the motor brakes may be coupled to the motor shafts via gears, via direct connection to the motor shaft, or via the pan drive belt 307 or the tilt drive belt 317. In still other embodiments, the brakes may be coupled to driven shafts (e.g., shafts that are coupled to the main pan gear 309 or the main tilt gear 319) rather than to the motor shafts.

As the pan and tilt braking systems 304 and 314 engage automatically when power is removed from the luminaire 12, the brakes themselves may be designed or selected for a reduced holding or braking torque, allowing an operator to overcome the torque to, for example, manually realign the pan or tilt position without using the motors. This also allows the operator to reposition pan and tilt when the unit is powered down (or otherwise ceases to receive electrical power), to allow aligning the yoke and/or luminaire head in a desired orientation to place the unit in a road case or other packaging. However, the reduced holding torque is selected to be sufficient to prevent the luminaire head from moving under gravity even when the internal components, particularly lenses which can be heavy, are in positions within the luminaire head that cause the luminaire head to be out of balance. In one such embodiment, the braking torque is 30% of the motor torque. However, the required braking torque may vary over a range of approximately 25% to 150% of the motor torque in other embodiments.

In another embodiment, the pan and tilt braking systems 304 and 314 are designed such that the brakes are automatically disengaged when the luminaire ceases to receive electrical power. For example a spring may act to disengage the spring and electrical power be applied to engage the brake. In such embodiments, when motion of the luminaire head is stopped by operator command, the pan and tilt braking systems 304 and 314 are engaged to hold the head in position, but when the luminaire is disconnected from the main power supply, the brakes are disengaged, to allow easy manual manipulation of the head position by an operator or technician.

For either type of brake (powered engaged or unpowered/ engaged), in some embodiments an additional mechanism (such as a latching solenoid) may be added to allow the brake to operate selectively as either powered/engaged or unpowered/engaged (or vice versa). In some such embodiments, the control system 200 responds to a command parameter of a Power Off Braking command signal received via the data link 14 by causing one or both of the pan and tilt braking systems 304 and 314 to remain in its current state when the luminaire ceases to receive electrical power. That is, the selected braking system remains engaged if it is currently engaged when power is removed, and remains disengaged if it is currently disengaged when power is removed.

In some embodiments, one or both of the pan and tilt braking systems 304 and 314 comprises a first element fixedly coupled (directly, by belt, or other coupling) to and rotating with the motor shaft and a second element biased by a spring to apply friction to the first element unless disengaged from the first element by an electromagnetic force. The second element is coupled to the chassis by a coupling that prevents rotation of the second element relative to the chassis, but allows motion toward and away from the first element.

In still other embodiments, the receipt of an Engage Brake command signal (enabling motor brakes) will inhibit response by the control system 200 to a Motion command to move the luminaire head in the pan and/or tilt axes that is received via the data link 14. In such embodiments, the response remains inhibited until a Disengage Brake command signal to release one or both of the brakes has been received. Thus, the operator can be assured that the luminaires will not move accidentally or inadvertently, due to pan and tilt commands received via the data link 14.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions and alterations can be made hereto without departing from the spirit and scope of the disclosure.

What is claimed is:

1. A luminaire comprising:
    a luminaire head comprising one or more optical devices;
    a movement system mechanically coupled to the luminaire head and configured to rotate the luminaire head around an axis of rotation, the movement system comprising:
        a motor coupled via a first mechanical coupling to the luminaire head and configured to cause rotation of the luminaire head about the axis of rotation;
        a braking system coupled via a second mechanical coupling to a shaft of the motor and configured to prevent rotation of the shaft of the motor; and
    a control system electrically coupled to the motor and the braking system and configured to receive an Engage Brake command via a data link and to engage the braking system in response to the Engage Brake command by:
        determining whether the motor is rotating;
        causing rotation of the motor to stop electrically when it is determined that the motor is rotating;
        determining whether the motor has stopped rotating;
        engaging the braking system when it is determined that the motor has stopped rotating; and
        removing power from the motor.
2. The luminaire of claim 1, wherein the control system is configured to receive a Disengage Brake command via the data link and release the braking system in response to the Disengage Brake command by:
  causing power to be applied to the motor;
  determining whether power has been applied to the motor; and
  disengaging the braking system when it is determined that power has been applied to the motor.

3. The luminaire of claim 2, wherein the control system is configured to determine whether power has been applied to the motor by sensing a current applied to the motor.

4. The luminaire of claim 2, wherein the control system is configured to receive a Motion command via the data link and rotate the motor in response to the Motion command only when the control system has received the Disengage Brake command more recently than the Engage Brake command.

5. The luminaire of claim 1, wherein the control system is configured to:
  receive a Braking Friction command via the data link, the Braking Friction command comprising data representing a desired amount of braking friction of the braking system; and
  adjust a braking friction of the braking system electrically in response to the data of the Braking Friction command.

6. The luminaire of claim 1, wherein the Engage Brake command comprises a control parameter and the control system is configured, in response to a value of the control parameter, not to remove power from the motor when responding to the Engage Brake command.

7. The luminaire of claim 1, wherein the braking system is coupled directly to the shaft of the motor.

8. The luminaire of claim 1, wherein rotation of the motor is caused to stop electrically by reducing a pulse frequency and a current of electrical signals applied to the motor.

9. The luminaire of claim 1, wherein the control system is configured to determine whether the motor is rotating based on signals received from a feedback system mechanically coupled to the motor.

10. The luminaire of claim 1, wherein the braking system is configured to prevent rotation of the shaft of the motor when the luminaire ceases to receive electrical power.

11. The luminaire of claim 1, wherein:
  the movement system is a first movement system, the braking system is a first braking system, and the axis of rotation is a first axis of rotation;
  the luminaire further comprises a second movement system mechanically coupled to the luminaire head and configured to rotate the luminaire head around a second axis of rotation, the second axis of rotation orthogonal to the first axis of rotation, the second movement system comprising a second braking system; and
  the control system is configured to engage the first braking system and the second braking system independently in response to the Engage Brake command.

12. The luminaire of claim 11, wherein the control system is configured to receive a Disengage Brake command via the data link and, in response to the Disengage Brake command, to:
  release the first braking system by:
    causing power to be applied to the motor of the first movement system;
    determining whether power has been applied to the motor of the first movement system; and
    disengaging the first braking system when it is determined that power has been applied to the motor of the first movement system; and
  release the second braking system by:
    causing power to be applied to the motor of the second movement system;
    determining whether power has been applied to the motor of the second movement system; and
    disengaging the second braking system when it is determined that power has been applied to the motor of the second movement system.

13. The luminaire of claim 12, wherein the control system is configured to release the first braking system and the second braking system independently, in response to the Disengage Brake command.

14. The luminaire of claim 11, wherein the Engage Brake command comprises a command parameter and the control system is configured to selectively engage one or both of the first braking system and the second braking system independently, in response to a value of the command parameter.

15. A luminaire comprising:
  a luminaire head comprising one or more optical devices;
  a movement system mechanically coupled to the luminaire head and configured to rotate the luminaire head around an axis of rotation, the movement system comprising:
    a motor coupled via a first mechanical coupling to the luminaire head and configured to cause rotation of the luminaire head about the axis of rotation;
    a braking system coupled via a second mechanical coupling to a shaft of the motor and configured to prevent rotation of the shaft of the motor; and
  a control system electrically coupled to the motor, the braking system, and non-volatile memory, the control system configured to receive an Engage Brake command via a data link and to engage the braking system in response to the Engage Brake command by:
    determining whether the motor is rotating;
    causing rotation of the motor to stop electrically when it is determined that the motor is rotating;
    determining whether the motor has stopped rotating;
    engaging the braking system when it is determined that the motor has stopped rotating;
    storing in the non-volatile memory a current absolute position of the luminaire head; and
    removing power from the motor.

16. The luminaire of claim 15, wherein the control system is configured to engage the braking system in response to determining that electrical power has been removed from the luminaire.

17. The luminaire of claim 15, wherein the control system is configured to receive a Disengage Brake command via the data link and disengage the braking system in response to the Disengage Brake command by:
  causing power to be applied to the motor;
  determining whether power has been applied to the motor; and
  disengaging the braking system when it is determined that power has been applied to the motor.

18. The luminaire of claim 15, wherein the control system is configured to determine that electrical power has been applied to the luminaire and, in response, to prepare the movement system for motion by:
  reading the current absolute position of the luminaire head from the non-volatile memory;
  initializing a motion control system with the current absolute position;
  causing power to be applied to the motor;
  determining whether power has been applied to the motor; and removing power from the braking system when it is determined that power has been applied to the motor.

19. The luminaire of claim 18, wherein the control system is configured, in response to an Enable Calibration command previously received by the control system via the data link, to cause the motion control system to perform a position calibration process when it is determined that electrical power has been applied to the luminaire.

* * * * *